United States Patent [19]

Funk

[11] Patent Number: 4,837,417
[45] Date of Patent: Jun. 6, 1989

[54] METHOD OF HARD-FACING A METAL SURFACE

[76] Inventor: Charles F. Funk, P.O. Box 6513, Gulfport, Miss. 39501

[21] Appl. No.: 164,784

[22] Filed: Mar. 7, 1988

Related U.S. Application Data

[63] Continuation-in-part of Ser. No. 788,405, Oct. 17, 1985, Pat. No. 4,745,254, which is a continuation-in-part of Ser. No. 557,760, Dec. 5, 1983, abandoned, which is a continuation-in-part of Ser. No. 455,923, Jan. 6, 1983, abandoned.

[51] Int. Cl.[4] ............................................. B23K 9/04
[52] U.S. Cl. ................................ 219/76.15; 219/76.12; 219/77
[58] Field of Search ............... 219/73, 73.2, 73.21, 219/76.1, 76.12, 76.14, 76.15, 77

[56] References Cited

U.S. PATENT DOCUMENTS

| | | | |
|---|---|---|---|
| 1,196,544 | 8/1916 | Heuser | 219/76.14 |
| 2,709,213 | 5/1955 | Gibson | 219/10 |
| 2,841,687 | 7/1958 | Richter | 219/76 |
| 3,573,420 | 4/1971 | Johnson | 219/76.15 |
| 3,823,030 | 7/1974 | Hudson | 117/131 |
| 4,097,711 | 6/1978 | Banerjee | 219/76.15 |
| 4,224,382 | 9/1980 | Brown et al. | 428/656 |

FOREIGN PATENT DOCUMENTS 0003116  7/1979  European Pat. Off. .
2041275A 9/1980  United Kingdom .

Primary Examiner—E. A. Goldberg
Assistant Examiner—Melissa C. Chiu
Attorney, Agent, or Firm—Vaden, Eickenroht, Thompson & Boulware

[57] ABSTRACT

A method of hard-facing is disclosed in which matrix metal is melted on the surface of a metal base member being hard-faced along with a portion of the metal base member by a non-consumable electrode moving over the matrix metal. The arc between the electrode and the matrix metal will produce a large pool of molten metal that moves along with the electrode. A constant stream of wear resistant particles, such as tungsten carbide that have been preheated to at least 400° F. are continuously fed to the back side of the pool of molten metal. The heat of the arc causes the molten metal in the pool to swirl which results in the wear resistant particles being distributed more or less evenly throughout the matrix metal from the bottom to the top as it solidifies behind the electrode.

23 Claims, 3 Drawing Sheets

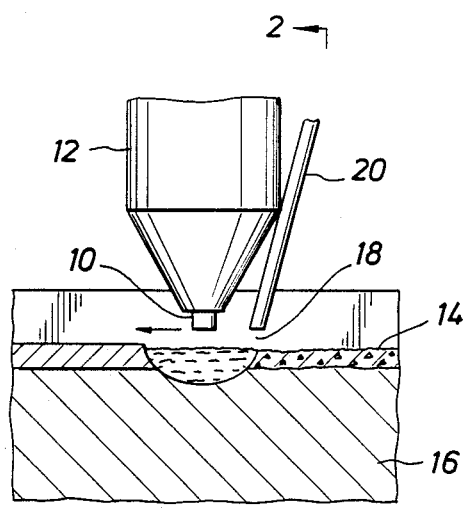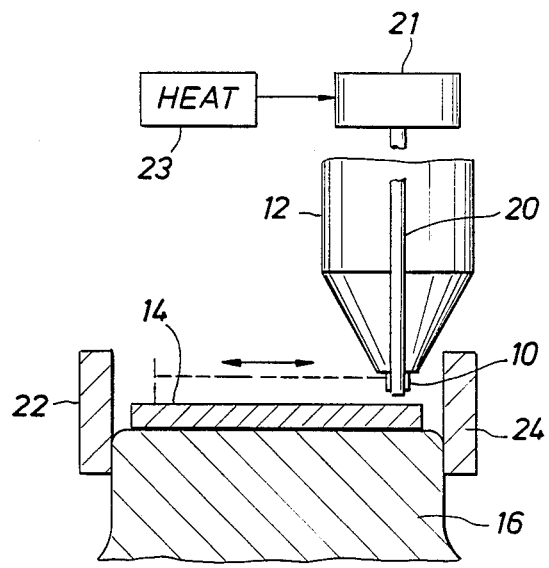
FIG. 1    FIG. 2
FIG. 3
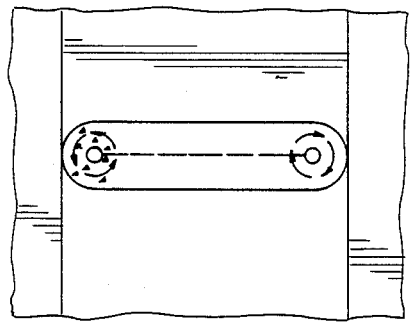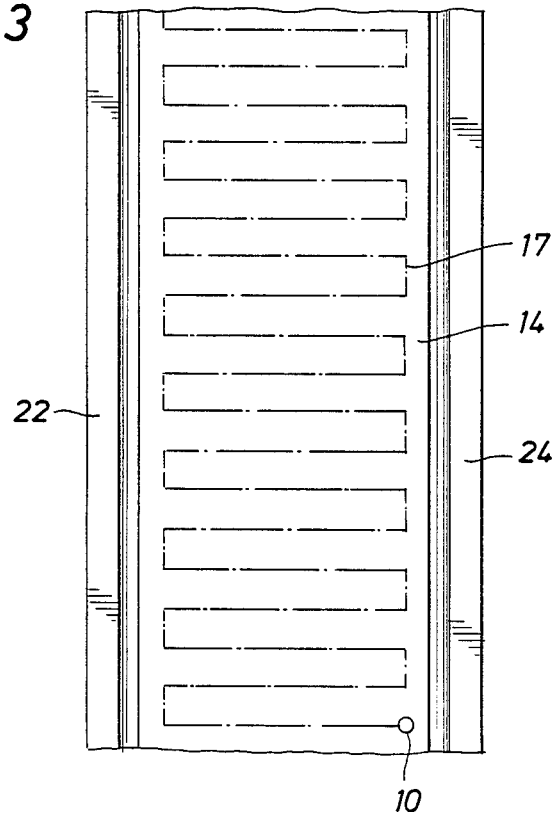
FIG. 4

METHOD OF HARD-FACING A METAL SURFACE

This is a continuation-in-part of application Ser. No. 788,405, filed Oct. 17, 1985, now becomes patented with U.S. Pat. No. 4,745,254, entitled "METHOD OF HARD-FACING A METAL SURFACE", which was a continuation-in-part of application Ser. No. 06/557,760, filed Dec. 5, 1983, entitled "METHOD OF HARD-FACING A METAL SURFACE", now abandoned, which was a continuation-in-part of application Ser. No. 06/455,923, filed Jan. 6, 1983, entitled "METHOD OF HARD-FACING A METAL SURFACE", now abandoned.

This invention relates to hard facing generally, and in particular, to a method of fusing to a metal surface a metal matrix in which particles of wear resistant material, such as tungsten carbide, are embedded.

Hard-facing is broadly defined as welding a wear-resistant metal onto a metal part. There are many types of hard-facing. The hard-facing of this invention is a matrix of steel that is bonded to a metal part and in which particles of wear resistant material are dispersed.

At present, most hard-facing is applied using one of two processes. One is the open arc process in which tungsten carbide particles contained in a consumable electrode are deposited on the metal part through the arc. In this process, no shielding gas is used as shielding is provided by materials in the electrode. Because of the intense heat of the arc, a relatively small amount of discrete particles of carbide remain in the deposit. The rest of the tungsten carbide is melted and goes into solution in the matrix of the deposit.

The second and by far the most popular process is the metal inert gas process. An electrode, usually of low carbon steel, is melted by the arc and shielded with an inert gas—most commonly argon. The tungsten carbide is metered into the molten metal puddle at a point behind the arc to reduce the amount of carbide that is melted by the heat of the arc. Because the molten metal quickly solidifies behind the arc, it is difficult to obtain a uniform carbide distribution.

As shown in FIG. 11, a decrease in mesh size results in an increase of the surface to volume ratio of the introduced carbide. A high ratio has a cooling effect on the surface of the weld puddle. As a result, the very fine carbide tends to be layered near the surface and in some cases fails to enter the weld puddle. If the fine particles are introduced closer to the arc to solve this, they are subject to being melted thereby reducing the amount of discrete carbide particles in the matrix. Thus, a uniform distribution of fine particles in the matrix is difficult to obtain.

For very large mesh sizes, the carbide has a low surface to volume ratio, which reduces substantially the tendency of the particles to melt. The pool of molten metal is cooled less, however, and the particles have less surface tension. Therefore, since tungsten carbide is much heavier than steel, the large mesh carbide partially tend to sink in the molten weld melt. This makes it very difficult to obtain a uniform distribution of the large or coarse mesh particles in the matrix of the hard-facing.

The tungsten carbide particles introduced into the weld puddle are usually contaminated with dirt, oil, oxidizing elements and almost certainly water. All of these contaminants, when heated by the welding process, produce hydrogen that when present in large amounts in the gas surrounding the welding arc results in a considerable amount being entrained in the molten metal. When the metal freezes, only a small part of the hydrogen remains soluble in the steel and the balance is disposed in the steel as atomic hydrogen. Atomic hydrogen is able to diffuse in the steel freely. When atoms of hydrogen meet in any void in the steel, they unite to form molecular hydrogen that cannot move freely in steel. As molecular hydrogen increases, the gas pressure within the void increases. This may build up until the tensile strength of the steel is reached. With ordinary mild steel or any non-hardenable steel, no harm is done by the high pressure entrapments of hydrogen, since the steel merely yields to relieve the pressure. Hardenable steel base material, however, creates another problem. Here the steel is hardened in the heat affect zone of the weld. When the gas pressure increases, due to the concentrations of molecular hydrogen, the yield strength of the steel is such that it cannot yield to relieve the pressure. Consequently, if enough hydrogen is present, it will continue to accumulate and build up pressures that will eventually exceed the ultimate stress of the steel and crack the steel.

Another problem that occurs when tungsten carbide particles at room temperature are introduced into the high temperatures present in the weld puddle. This is the creation of stress fatigue zones around the particles. These stress fatigue zones can, in time, promote stress-related crack propagation under extreme loading and shock conditions, such as repeated impact.

It is an object and feature of this invention to substantially reduce the amount of hydrogen in the gas surrounding the welding arc when practicing the method of this invention by preheating the tungsten carbide particles sufficiently to drive off the contaminants from the particles before they are introduced into the weld puddle.

It is another feature and advantage of this invention that by preheating the tungsten carbide particles the tendency of the particles to promote stress fatigue zones around the particles in the metal matrix weld pool is substantially reduced. As a result, the overall toughness and ductility of the hard surfacing is such that it can withstand extreme service conditions such as those present on hammer parts and hammer mills and other applications where the hard surfacing is subjected to impact loading.

These and other objects, advantages, and features of this invention will be apparent to those skilled in the art from a consideration of this specification, including the attached drawings and appended claims.

In the drawings:

FIG. 1 is a side view of a non-consumable electrode as it is employed in the practice of the method of this invention to melt a strip of matrix metal as it passes over the strip of metal while particles of wear resistant material, such as tungsten carbide, are fed into the molten pool of metal below the electrode with the matrix metal and base metal shown in section;

FIG. 2 is a sectional view taken along line 2—2 of FIG. 1 and further including the hopper for the particles and a source of heat for preheating the particles;

FIG. 3 is a plan view of a portion of the set up in FIG. 2 showing the path the electrode will follow in hard-facing a stabilizer blade;

FIG. 4 is a plan view of the pool of molten metal that extends laterally across the strip of matrix metal below the electrode showing the swirling action imparted to the molten metal by the arc between the electrode and the molten metal;

Figure 5:
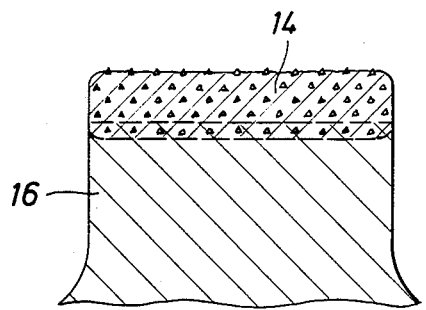
FIG. 5 is a sectional view through the stabilizer blade of FIG. 2 after it has been hard-faced using the method of this invention.

In accordance with this invention, a strip of the desired matrix metal is placed on the surface of the metal base member to be hard-faced. A non-consumable electrode is then passed over the matrix metal to melt the matrix metal under the electrode and a portion of the base metal to form a pool of molten metal that extends laterally across the strip of matrix metal and that moves longitudinally with the electrode to fuse the matrix metal to the base member. A constant stream of hard, wear resistant particles, such as tungsten carbide particles, that have been preheated to remove substantially all contaminants is supplied to the molten pool of metal. The particles are held in suspension in the molten metal due to the swirling action imparted to the molten metal by the heat from the electrode. As the electrode moves along the matrix metal, the rear edge of the molten pool under the electrode will solidify behind the electrode and trap the swirling particles adjacent the rear of the pool. This results in the particles being distributed substantially uniformly throughout the solidified matrix from the bottom to the top.

In FIG. 1, tungsten electrode 10 is positioned by electrode holder 12 directly above strip 14 of matrix metal that rests on the surface of base member 16 to be hard-faced.

Base member 16 is shown in FIGS. 1 through 5, as a rib or blade of a stabilizer. Usually, stabilizer blades are from two to three inches wide and ten to twenty inches long. They are often helical in shape.

To hard-face member 16, in accordance with this invention, elongated strip 14 of matrix metal is centrally located along the surface. As the matrix metal is melted under the electrode, it will flow as a liquid so dams 22 and 24 of copper are clamped to each side of base member 16 as shown in FIG. 2. Electrode 10 is moved over the strip of matrix metal along a path such as path 17 shown in FIG. 3. Assume for example, that the width of base member 16 is 2¼" (5 7 cm), strip 14 of matrix metal will be about 2" (5 cm) wide and ¼" thick. To completely melt the matrix metal, electrode 10 will oscillate about 1½"(3.8 cm) coming within ¼" (0.6 cm) of the edge of the strip of matrix metal. This is all that is necessary since the electrode will be melting metal extending from its center line for one-half to three-quarters of an inch (1.27–1.9 cm) creating a rather large pool of liquid metal into which the particles of tungsten carbide are fed.

The oscillating speed should be about eighty inches per minute (203 cm/min) and the longitudinal speed about two inches per minute (5 cm/min). The electrode will dwell at the end of each lateral movement from one-fourth to one-half a second. This is another reason why the electrode does not have to move closer to the edge of the strip of matrix metal to completely melt it.

To obtain the desired results, the matrix metal must be heated rapidly to a relatively high temperature and there must be sufficient heat to not only melt the matrix metal, but a portion of the metal adjacent the surface of base member 16. Preferably, the TIG welding process using direct current straight-polarity (DCSP) is used. This process employs a virtually non-consumable tungsten electrode of one-sixteenth to one-quarter inches (0.165–0.635 cm) in diameter that provides a highly concentrated heat source in the arc between the electrode and the workpiece, here, the strip 14 of matrix material that can maintain a pool of molten metal that extends across the strip of matrix metal.

Tungsten carbide particles 18 are preheated in hopper 21 by heat source 23, preferably to between 400°–500° F. by heat source 23, before being fed through tube 20 into the pool of molten metal.

The result is shown in FIG. 5, where strip 14 has been fused with base member 16. The fused area being shown double cross-hatched. The individual particles of tungsten carbide are shown triangular although they are usually oblong to round. The build up will be about one-quarter of an inch (b 0.6 cm).

One of the largest users of hard-facing are the tool joints used to connect the joints of drill pipe used to drill oil and gas wells. The tool joints are larger in diameter than the drill pipe. In an open hole, the tool joints rub against the formations through which the well has been drilled, as the drill pipe is rotated. Some of these formations are of very hard, abrasive material that can wear away the outside surface of the tool joints rapidly if they are not protected by hard-facing. This is a particularly serious problem in well bores that deviate from the vertical.

Figure 6:
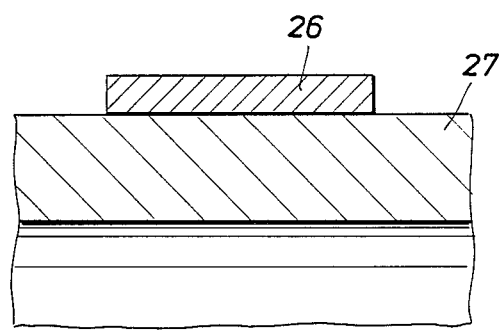
FIG. 6 is a sectional view along the longitudinally axis of a tubular member with the arcuate strip of matrix metal in position but without the side dams.

A practical example of the use of the method of this invention to hard-face a tool joint is shown in FIGS. 5 and 6. In this example, the matrix metal was a cast steel material containing between thirty and thirty-five percent chromium, two to three percent manganese, and eight tenths to nine tenths of a percent of vanadium. The remainder was iron. The material was cast into two semi-circular sections about two inches wide having with a diameter to fit the outside of a six inch diameter pipe. One of said sections is indicated by the number 26 in FIG. 6. The wall of the tool joint is indicated by the number 27.

The tool joint was 4140 steel and the matrix metal as cast was one-quarter inch thick by two inches wide. The area of the tool joint to be hard-faced was first ground to remove all millscale, rust, dirt, grease, and foreign matter and wire brushed. The cast matrix metal was also cleaned in the same manner. The two semi-circular halves of the cast strip were then fitted onto the tool joint and tack welded in place. To avoid cracking the cast matrix metal, it was preheated to about 250° F. before being tack welded to the pipe.

In this hard-banding process, the tool joint was rotated under an oscillating electrode. A Linde HW-26 torch was used with a Linde HW-500SS power supply. The hard-facing process, as described above, was carried out with the electrode being supplied with 450 to 460 amperes of electricity at between 17 and 19 volts.

One of the surprising results of the above described hard-facing process was the dramatic change that occurred in the properties of the matrix material. In its as cast state, it was very brittle, hard, about 60 Rockwell C, and could be shattered with a hammer. After being subjected to the hard-facing process of this invention, it appeared in cross-section as shown in FIG. 6. The matrix metal had suddenly become very tough and could take repeated blows from a sledge hammer without cracking. It had been transformed from a very brittle, inelastic material into a very tough, wear resistant, metal in and of itself and one that has the remarkable ability to wear smooth rather than rough as it is worn down. Its hardness dropped to about 48 Rockwell C.

In this connection, it appears that the best results are obtained with this method when the matrix material has a relatively high electrical resistance as compared to ordinary steel, and is a poor conductor of heat, again as compared to ordinary steel. For example, stainless steel, which has a high chrome content and also a high nickel content, gives very good results when used as the matrix material for this invention. When stainless steel is used, the amperage and voltage for the electrode is raised to around 480 amperes and 20 to 22 volts.

It has been observed that the viscosity of the molten cast material described above appears to be much less than that of ordinary low carbon steels. The same is true of high chromium stainless steels and manganese steels. As a result, the force of the arc against the pool or puddle of liquid metal causes the metal to swirl rapidly in the manner shown in FIG. 4. In observing the process, the swirling liquid as it moves toward the rear of the puddle, which will extend over the two inch wide strip, seems to throw the tungsten carbide particles against the rear of the pool with the result that the particles do not settle out at the bottom, but are evenly spread in the solidified matrix material from the bottom to the top of the matrix.

Figure 7:
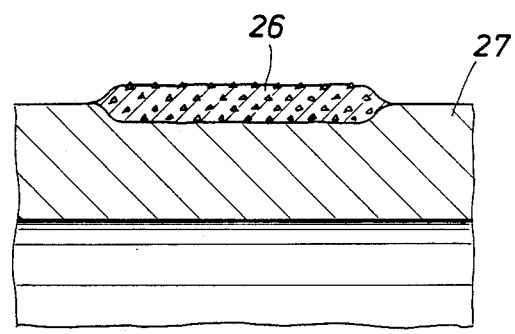
FIG. 7 is a sectional view of the tubuler member shown in FIG. 6 after it has been hard-faced in accordance with the method of this inventions.
Figure 8:
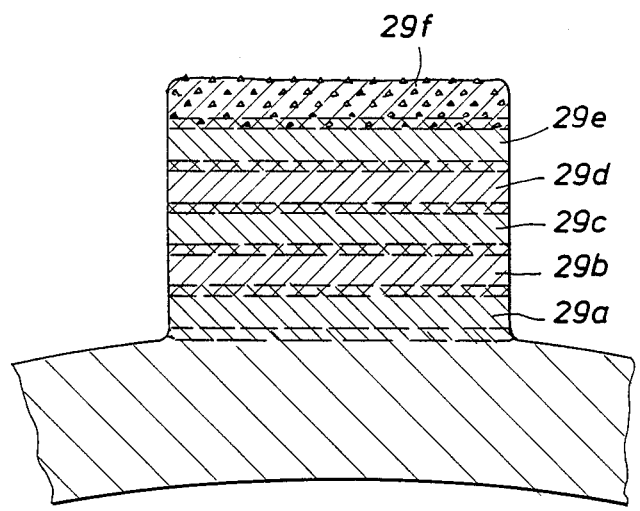
FIG. 8 is cross sectional view of a tubuler member and a rib that has been built up on the surface of the member with the outer surface of the rib hard-faced employing the method of this invention thereby eliminating most of the machining involved in manufacturing a product having integrally attached ribs, such as a stabilizer.

By modifying the process somewhat, it can be used to build up a surface to a substantial thickness with the hard-facing layer on its outer surface. For example, as shown in FIG. 7, a stabilizer blade could be built up on the outside surface of a tubular member in the manner shown. Six strips 29a–29f of metal of the desired characteristics would be successively fused to each other using the electrode in the manner described above without the addition of the tungsten carbide particles, except during the melting and fusing of the last matrix strip. Thus, a blade can be built-up on the surface of a tubular member and the blade would be integrally attached to the tubular member and very little machining would be required to provide the end product.

The end product of this method produces a hard-faced surface where usually quite a large number of the tungsten carbide particles will be sticking out of the top of the matrix. Usually, and particularly where the hard-facing is on a downhole tool, the surface will be ground down to gauge and the particles protruding will be knocked off, leaving a smooth surface with the remaining tungsten carbide particles embedded at or below the surface.

Previously, a choice had to be made between three different hard-facings. One using coarse mesh tungsten carbide particles 8–30 mesh, one using fine mesh, 60–120 mesh, and a third called an "overlaid hard-facing" where a coarse mesh deposit is covered by a layer of alloy steel. Wear rate tests of the three types showed that the coarse mesh had a high wear rate initially that decreased as the hard-facing was worn away. This was because before this invention, most of the coarse mesh particles sunk to the bottom of the matrix as the hard-facing was formed. Therefore, the outer portion contained very few carbide particles and wore away rapidly. The overlaid hard-facing had a similar wear pattern for the same reasons. The fine mesh hard-facing had the best wear properties initially, but dropped below the coarse mesh after a substantial portion had been worn away, where the same total volume of carbide was used in both.

Frequently, a portion of the drill pipe will be rotating in a cased hole. Here the wear on the casing by the rotating tool joints is the major concern. Tests indicate that, as hard-faced, i.e. without being ground smooth, the coarse mesh wore away the casing rapidly. This was expected because the surface "as hard-faced" is rough and uneven and the few particles that protrude from the surface act as cutting tools. The same is true of the fine mesh, but to a lesser degree.

It was found, however, that if the coarse mesh was ground smooth, it caused less wear of the casing than even a non-hard-faced tool joint. Therefore, it is one of the features of this invention to provide a method of hard-facing where coarse mesh and fine mesh particles are substantially uniformly distributed in the matrix of the hard-facing to obtain the benefits of each size.

Figure 9:
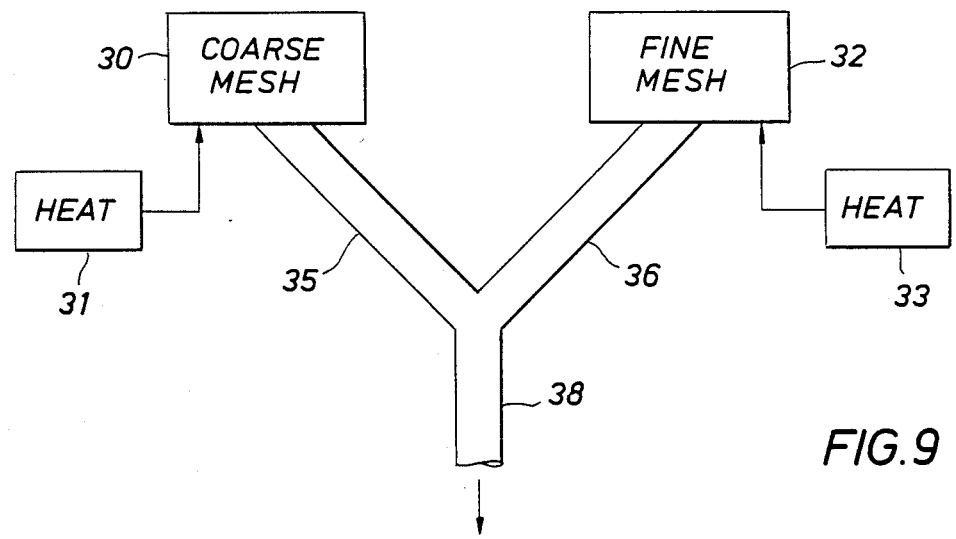
FIG. 9 is a schematic diagram of a system for feeding a preheated mixture of coarse mesh and fine mesh particles to the molten metal under the electrode.

In FIG. 9, hopper 30 contains coarse mesh particles and hopper 32 contains fine mesh particles. These are variable feed hoppers so the ratio of coarse to fine can be adjusted as desired. After being preheated, in accordance with this invention, at least 400° F. by heat sources 31 and 32, the particles travel through tubes 35 and 36 to common tube 38 where they are mixed as they fall by gravity into the pool of molten matrix metal described above. A matrix 40 bonded to the wall of the tool joint 42 with a mixture of coarse and fine particles of tungsten carbide generally uniformly distributed throughout the matrix.

Figure 10:
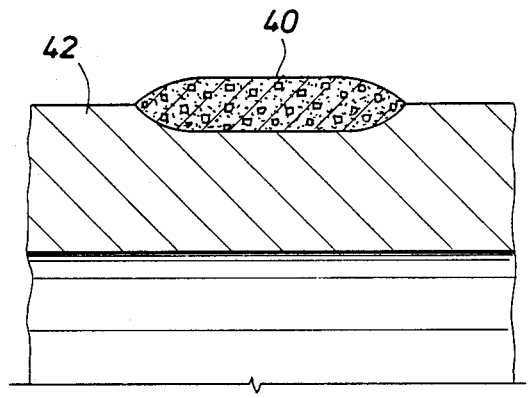
FIG. 10 is a view similar to FIG. 6 where the hard-facing contains a mixture of coarse mesh and fine mesh particles.
Figure 11:
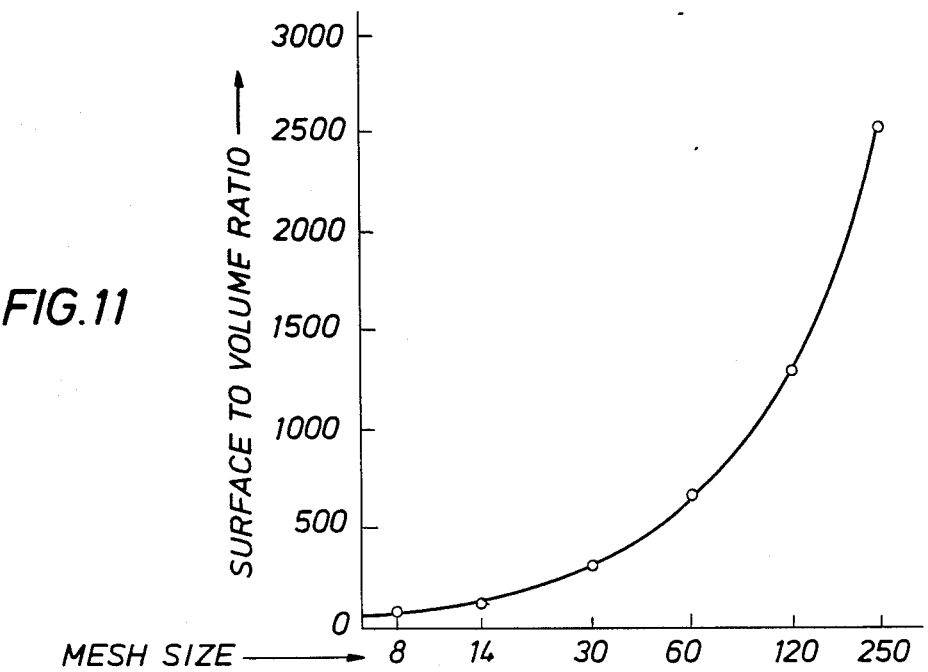
FIG. 11 is a graph of surface to volume ratio for tungsten carbide particles of different mesh and particle size.

FIG. 10 shows the end product. To distinguish between the two, the coarse is shown square and the fine round.

From the foregoing it will be seen that this invention is one well adapted to attain all of the ends and objects hereinabove set forth, together with other advantages which are obvious and which are inherent to the method.

What is claimed is:

1. A method of hard-facing the surface of a metal base member with a matrix of metal having particles of wear resistant material, evenly distributed therein comprising the steps of positioning a member of the desired matrix metal on the surface to be hard-faced, moving a nonconsumable electrode over the member to melt the matrix metal and a portion of the base metal to form a pool of liquid metal that swirls under the electrode, heating wear resistant particles to substantially reduce the contaminants, and introducing a stream of the preheated wear resistant particles into the pool of liquid metal under the electrode to be entrained by the swirling liquid so that the particles are distributed throughout the matrix from the top to the bottom when the matrix metal solidifies.

2. The method of claim 1 in which the stream of wear-resistant particles is a mixture of light and coarse particles.

3. The method of claims 1 or 2 in which the particles are tungsten carbide.

4. The method of claim 2 in which most of the coarse particles are 8-14 mesh and most of the fine particles are 60-120 mesh.

5. The method of claim 1 in which the matrix metal is an alloy containing at least 16% chromium.

6. The method of any of the preceding claims in which the matrix metal is cast, contains at least 30% by weight chromium, 2% by weight manganese, and has a hardness of about 60 Rockwell C.

7. The method of claim 1 in which the electrode is supplied with at least 450 amperes.

8. The method of claim 1 in which the matrix metal is a steel that has a relatively high resistance to the flow of electrical current and is a relatively poor conductor of heat as compared to low carbon steels.

9. The method of claim 1 in which the particles are preheated to at least 400° F.

10. A method of hard-facing a metal base member with a tough, wear resistant metal matrix from 3/16" to ⅜" or more thick having substantially uniformly distributed, throughout the matrix, hard, wear resistant particles of a diameter substantially less than the thickness of the matrix, comprising the steps of positioning a member of cast matrix metal on the surface to be hard-faced, said metal having a composition that is suitable for the formation of a swirling molten metal pool when melted and a tough, wear resistant matrix having a hardness of about 48 Rockwell C when resolidified; moving a non-consumable, welding electrode supplied with electricity over said matrix metal member to melt that portion of said matrix metal member that is in close proximity to said electrode and a portion of the metal base member therebelow to form a moving, swirling, molten metal pool; and simultaneously introducing a stream of hard, wear resistant particles preheated to at least 400° F. and of a diameter subttantially less than the thickness of said matrix metal member into said pool such that said particles are substantially uniformly distributed and suspended in said pool for entrapment as the rear edge of said pool solidifies behind said electrode as it moves.

11. A method of hard-facing as recited in claim 10 wherein said particles are tungsten carbide particles.

12. A method of hard-facing as recited in claim 10 wherein said stream of hard, wear resistant particles is a mixture of fine and coarse particles.

13. A method of hard-facing as recited in claim 12 wherein said particles are tungsten carbide particles.

14. A method of hard-facing as recited in claim 12 wherein the ratio of coarse particles to fine particles has been optimized such that the resulting hard-facing has wear characteristics which are normally associated with both coarse particle hard-facing and fine particle hard-facings.

15. A method of hard-facing as recited in claim 14 wherein said particles are tungsten carbide particles.

16. A method of hard-facing as recited in claim 12 wherein most of said coarse particles are 8-14 mesh and most of said fine particles are 60-120 mesh.

17. A method of hard-facing as recited in claim 16 wherein said particles are tungsten carbide particles.

18. A method of hard-facing as recited in claim 11 wherein said matrix metal is a cast steel containing about 30-35% chromium by weight.

19. A method of hard-facing as recited in claim 18 wherein said particles are tungsten carbide particles.

20. A method of hard-facing as recited in claim 10 wherein said matrix metal is a cast steel containing 30% to 35% chromium, 2% to 3% manganese, and 0.8% to 0.9% vanadium by weight.

21. A method of hard-facing as recited in claim 20 wherein said particles are tungsten carbide particles.

22. A method of hard-facing as recited in claim 10 wherein said matrix metal is a steel having relatively high electrical resistance and relatively low thermal conductivity as compared to low carbon steels.

23. A method of hard-facing as recited in claim 22 wherein said particles are tungsten carbide particles.

* * * * *